US006793229B1

(12) United States Patent
Nadal

(10) Patent No.: US 6,793,229 B1
(45) Date of Patent: Sep. 21, 2004

(54) GLIDER WHEELCHAIR

(76) Inventor: Robert Nadal, P.O. Box 18504, Rochester, NY (US) 14618

(*) Notice: Subject to any disclaimer, the term of this patent is extended or adjusted under 35 U.S.C. 154(b) by 0 days.

(21) Appl. No.: 10/634,095

(22) Filed: Aug. 4, 2003

(51) Int. Cl.[7] .................................................. B60M 1/14
(52) U.S. Cl. ..................................... 280/250.1; 297/273
(58) Field of Search ........................... 280/250.1, 304.1; 297/273, 281, 282

(56) References Cited

U.S. PATENT DOCUMENTS 5,865,457 A * 2/1999 Knabusch et al. ....... 280/304.1
6,089,584 A * 7/2000 Cobb ...................... 280/250.1

* cited by examiner

*Primary Examiner*—Kevin Hurley
(74) *Attorney, Agent, or Firm*—Michael I. Kroll

(57) ABSTRACT

The present invention 10 discloses a glider wheelchair which includes an outer frame 20 that supports the wheel structure and an inner frame 24 that supports the seat 22. The outer 20 and inner 24 frames are interconnected by means of a pair of swing arms 18 on the front and rear of the wheelchair 10 that allow the inner 24 frame to pivot and glide within the outer 20 frame. The swing arms 18 pivot between the front 50 and rear wheels 52 allowing the center of gravity to remain within the wheelchair 10 frame while in motion ensuring stability. The upper end of the swing arms 18 are hinged at 28 to the outer wheel frame 20 and the lower end of the swing arms are hinged to the inner seat frame 24. To protect the occupant 12 from pinch points created by the pivoting motion, the glider wheelchair arm rests 14 are molded to cover the upper pivot hinge 28. In addition, to prevent an undesired swinging motion, a locking handle 16 is affixed to the outer frame 20. In other embodiments of the glider wheelchair 10, the wheelchair includes mechanical wheel brakes 36, 38, front 40 and/or rear 42 stops to restrict the swing arc and dual motor drive system controls 44, 46 powered by a battery pack 48.

16 Claims, 12 Drawing Sheets

GLIDER WHEELCHAIR

BACKGROUND OF THE INVENTION

Field of the Invention

The present invention relates generally to wheelchairs, more specifically, to a wheelchair with means to swing in a gliding motion.

In 1770, a most clever and free thinking Ben Franklin put the rock in the rocking chair perhaps aspiring to recall the soothing effects of an infant's rocking cradle. Soon after the conventional (runner) rockers were invented, glider rockers were developed providing the same soothing effects of the conventional rocker while providing improved stability and space saving advantages.

The present invention takes advantage of these prior arts to aspire the same soothing effects with users of wheelchairs.

The present invention glider wheelchair includes an outer frame that supports the wheel structure and an inner frame that supports the chair. The outer and inner frames are interconnected by means of a pair of swing arms on each side of the wheelchair that allow the inner frame to pivot and glide within the outer frame. The swing arms pivot between the front and rear wheels allowing the center of gravity to remain within the wheelchair while in motion ensuring stability.

The upper end of the swing arms are hinged to the outer wheel frame and the lower end of the swing arms are hinged to the inner seat frame. To protect the occupant from pinch points created by the pivoting motion, the glider wheelchair arm rests are molded to cover the upper pivot hinge.

In addition, to prevent an undesired swinging motion, a locking handle is affixed to the outer frame. When engaged, the locking handle rod penetrates an aperture in the swing arm preventing the wheelchair from swinging motion.

When the handle is positioned for free motion, the locking pin is retracted from the swing arm allowing the swing arm to pivot. The pivot hinge interconnects the outer and inner frame and is supported by a sleeve bearing to provide spacing between the arms.

In a preferred additional element of the glider wheelchair, the wheelchair includes mechanical wheel brakes. Front and/or rear wheel brakes are engaged to maintain a stationary position while the user utilizes glide motion. Typical of prior art, the brake mechanisms are positioned such that the rear wheel brake is engaged by hand, and the foot engages the front wheel brake.

In another preferred additional element of the glider wheelchair, the wheelchair includes front and/or rear stops to restrict the swing arc. By including restrictor stops to limit the arc of the swing, the center of gravity is better contained within the wheelchair frame and thus stability of the wheelchair is improved.

In still another preferred additional element of the glider wheelchair, the wheelchair includes a dual motor drive system. One drive system controls the linear motions of the wheelchair (typical of electrically powered wheelchairs), and another drive system provides means for automatic swing gliding motion. The glide motor drive contains a variable speed switch to control the speed and height of automatic glide motion. An interlock switch is provided to lock the frame and disable the linear motion controls. When glide motion is enabled, the linear motion controls are disabled and the wheel lock is engaged. When glide motion is disabled, the frame is locked and the linear motion controls are enabled allowing the user to move from point to point. A battery pack is used to power both glide motor drive and linear motor drive systems.

DESCRIPTION OF THE PRIOR ART

There are other glider chairs in the prior art. Typical of these is U.S. Pat. No. 745,334 issued to George A. Dutton on Dec. 1, 1903.

A patent was issued on Feb. 28, 1967 as U.S. Pat. No. 3,306,660 to Jeffery L. Williams. Another patent was issued to L. A. Kiel on Dec. 10, 1968 as U.S. Pat. No. 3,415,531. Yet another U.S. Pat. No. 4,118,046 was issued to Curtis T. Vaughan on Oct. 3, 1978 and still yet another was issued on Nov. 14, 1978 to Louise A. Kiel as U.S. Pat. No. 4,125,269.

U.S. Pat. No. 4,544,200 was issued to Philip Dunn on Oct. 1, 1985. Another patent was issued to Robert C. Ayers on Feb. 10, 1987 as U.S. Pat. No. 4,641,848. Yet another U.S. Pat. No. 4,707,026 was issued to Paul J. Johansson on Nov. 17, 1987.

Another was issued to Robert C. Ayers on Apr. 2, 1991 as U.S. Pat. No. 5,004,259. Still yet another patent was issued to Gerold G. Goertzen on Nov. 19, 1996 as U.S. Pat. No. 5,575,348. U.S. Pat. No. 5,853,059 was issued on Dec. 29, 1998 to Gerold G. Goertzen and on Jul. 18, 2000, Stanley B. Cobb was issued U.S. Pat. No. 6,089,584.

This invention relates to certain improvements in convertible chairs, and has for its principal object to provide an improved form of chair which may be readily converted into a standing, rocking, rolling, or reclining chair. A further object of the invention is: to provide improved means for forming a yielding support between the supporting-frame and the chair proper.

This invention relates generally to wheel chairs and more particularly to apparatus enabling a non-ambulatory individual sitting in a wheel chair to wheel the chair about an area in conventional manner then place the chair in a rocking state and use it as a rocking chair, and then return the chair to its original state for wheeling along, all without external assistance and all while the individual remains seated in the wheel chair.

A rocking wheel chair where the rocking motion of the chair is possible only when the driving wheels are braked and an anti-tilt leg is engaged with the ground at the rear. With the wheel unbraked and the anti-tilt leg out of engagement with the ground, the chair is locked against a rocking motion.

A removable, easy to use rocker assembly is provided which can be quickly installed on a standard wheelchair without modifications or damage to the same and which includes a pair of shiftable arcuate rockers movable between a retracted and rocking position without the necessity of having the occupant leave the wheelchair, or complicated, time-consuming adjustments of the assembly or chair itself. The overall rocker assembly includes a pair of separate, identical, rocker structures respectively and removably mounted adjacent the wheels of the chair and independently shiftable for selective positioning of the rockers in a chair-supporting, supporting, rocking position. The rocker structures each include a frame removably secured to the wheelchair, linkage pivotally coupled between the frame and rocker, and stabilizing means for preventing unintended movement of the rocker in use thereof relative to the chair so as to present an extremely stable rocking wheelchair. Operating mechanism having a shiftable handle is also provided for easy selective movement of the rockers by a person sitting in the chair or by an attendant.

A recliner-rocker geriatric wheel chair having a unitary member movable between a first position wherein the chair is allowed to rock and a second position wherein the chair is prevented from rocking motion. In the first position the unitary member functions to both stabilize the chair against rearward tilt and to brake the ground engaging wheel against movement. In the second position the unitary member engages the seat portion of the chair and prevents it from rocking.

A wheelchair seat and back construction adapted to be removably mounted upon a conventional wheelchair frame. A chair base with seat and back member secured thereto is mounted to a chair support by springs positioned between the base and support with the support secured to the wheelchair frame such that the wheelchair user can rock in the chair by reason of the spring mounting between the chair support and chair base. Front and rear lock levers are provided to selectively secure the chair base with seat and back member attached relative to the wheelchair frame to maintain the seat and back in rigid, unrocking condition. The seat and back members are hingedly connected to each other with the seat member being slidably movable upon tracks mounted to the chair base to permit the back member to move into a reclining position for the user upon movement of the seat member. Movement of the seat member upon said tracks is controlled by a reclining release lever which may selectively be positioned for access from the front or rear of the wheelchair so as to prevent the wheelchair user from moving the back member into reclining position, if desired.

An improved wheelchair formed of a frame, two pairs of support wheels for the frame, and a seat rockably connected to the frame and normally maintained in a generally horizontal alignment when the chair is unoccupied by bias springs that permit the seat to rock about its rockable connection while the frame and wheels of the chair are completely stationary.

A mobile rockable wheelchair having releasable locking means for locking the chair seat thereof in a substantially non-inclined position for exiting from the chair. The means for enabling rocking movement of the chair seat is achieved by a parallel four bar linkage assembly connected between the mobile pedestal, seat and backrest unit of the chair. A releasing lever arrangement is located within convenient reach of the chair's occupant. Adjustable and removable arm rest members are provided mounted on a common support frame for the seat and backrest unit of the chair. The support frame is suitable for mounting a variety of different chair seat and backrest units.

An improved rocking wheelchair formed of a frame, two sets of support wheels for the frame, and a seat portion rockably connected to the frame by a rocking assembly that normally maintains the seat in a generally horizontally alignment when the chair is unoccupied and permits the seat to rock with respect to the frame when the chair is completely stationary.

A wheelchair includes a frame having first and second longitudinal sides connected by a bridge and a seat module carried by the frame. A first power drive assembly is disposed on the frame first longitudinal side. The first power drive assembly includes a first swing arm pivotally secured to the frame, a first motor mounted to the first swing arm and a first wheel operably connected to the first motor. A second power drive assembly is disposed on the frame second longitudinal side. The second power drive assembly includes a second swing arm pivotally secured to the frame, a second motor mounted to the second swing arm and a second wheel operably connected to the second motor. A first resiliently biased anti-tip assembly is secured to both the frame first longitudinal side and the first motor. A second resiliently biased anti-tip assembly is secured to both the frame second longitudinal side and the second motor.

A wheelchair includes a frame having first and second longitudinal sides connected by a bridge and a seat module carried by the frame. A first power drive assembly is disposed on the frame first longitudinal side. The first power drive assembly includes a first swing arm pivotally secured to the frame, a first motor mounted to the first swing arm and a first wheel operably connected to the first motor. A second power drive assembly is disposed on the frame second longitudinal side. The second power drive assembly includes a second swing arm pivotally secured to the frame, a second motor mounted to the second swing arm and a second wheel operably connected to the second motor. A first resiliently biased anti-tip assembly is secured to both the frame first longitudinal side and the first motor. A second resiliently biased anti-tip assembly is secured to both the frame second longitudinal side and the second motor.

A hand wheeled cart attachment for a "rocker glider" chair or the like with a wooden frame having a foot rest, casters in the front end and large hand wheels in the rear.

While these wheelchair and rocking chairs may be suitable for the purposes for which they were designed, they would not be as suitable for the purposes of the present invention, as hereinafter described.

SUMMARY OF THE PRESENT INVENTION

The present invention discloses a glider wheelchair which includes an outer frame that supports the wheel structure and an inner frame that supports the seat. The outer and inner frames are interconnected by means of a pair of swing arms on each side of the wheelchair that allow the inner frame to pivot and glide within the outer frame. The swing arms pivot between the front and rear wheels allowing the center of gravity to remain within the wheelchair frame while in motion ensuring stability. The upper end of the swing arms are hinged to the outer wheel frame and the lower end of the swing arms are hinged to the inner seat frame. To protect the occupant from pinch points created by the pivoting motion, the glider wheelchair arm rests are molded to cover the upper pivot hinge. In addition, to prevent an undesired swinging motion, a locking handle is affixed to the outer frame. In a preferred additional element of the glider wheelchair, the wheelchair includes mechanical wheel brakes. In another preferred additional element of the glider wheelchair, the wheelchair includes front and/or rear stops to restrict the swing arc. In still another preferred additional element of the glider wheelchair, the wheelchair includes a dual motor drive system powered by a battery pack.

A primary object of the present invention is to provide a wheelchair with means to swing in a gliding motion.

Another object of the present invention is to provide a wheelchair with an inner frame and outer frame connected with swing arms for means to glide.

Still another object of the present invention is to provide a wheelchair with locking means to prevent an undesirable gliding motion.

Yet another object of the present invention is to provide a wheelchair with wheel brakes to restrict chair movement while swinging in a gliding motion.

Still another object of the present invention is to provide a wheelchair with stop(s) to restrict the arc of swing to improve stability of the chair.

Another object of the present invention is to provide a wheelchair with electrical power to automatically swing in a gliding motioning.

Yet another object of the present invention is to provide a wheelchair with electrical powered switch to variably control the speed of the gliding motion.

Still another object of the present invention is to provide a wheelchair with electrical powered switch to enable and disable the brakes.

Additional objects of the present invention will appear as the description proceeds.

The present invention overcomes the shortcomings of the prior art by providing a wheelchair with an inner frame and outer frame connected with swing arms for means to glide, while maintaining the ability to self enable and disable the gliding feature in a seated position.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
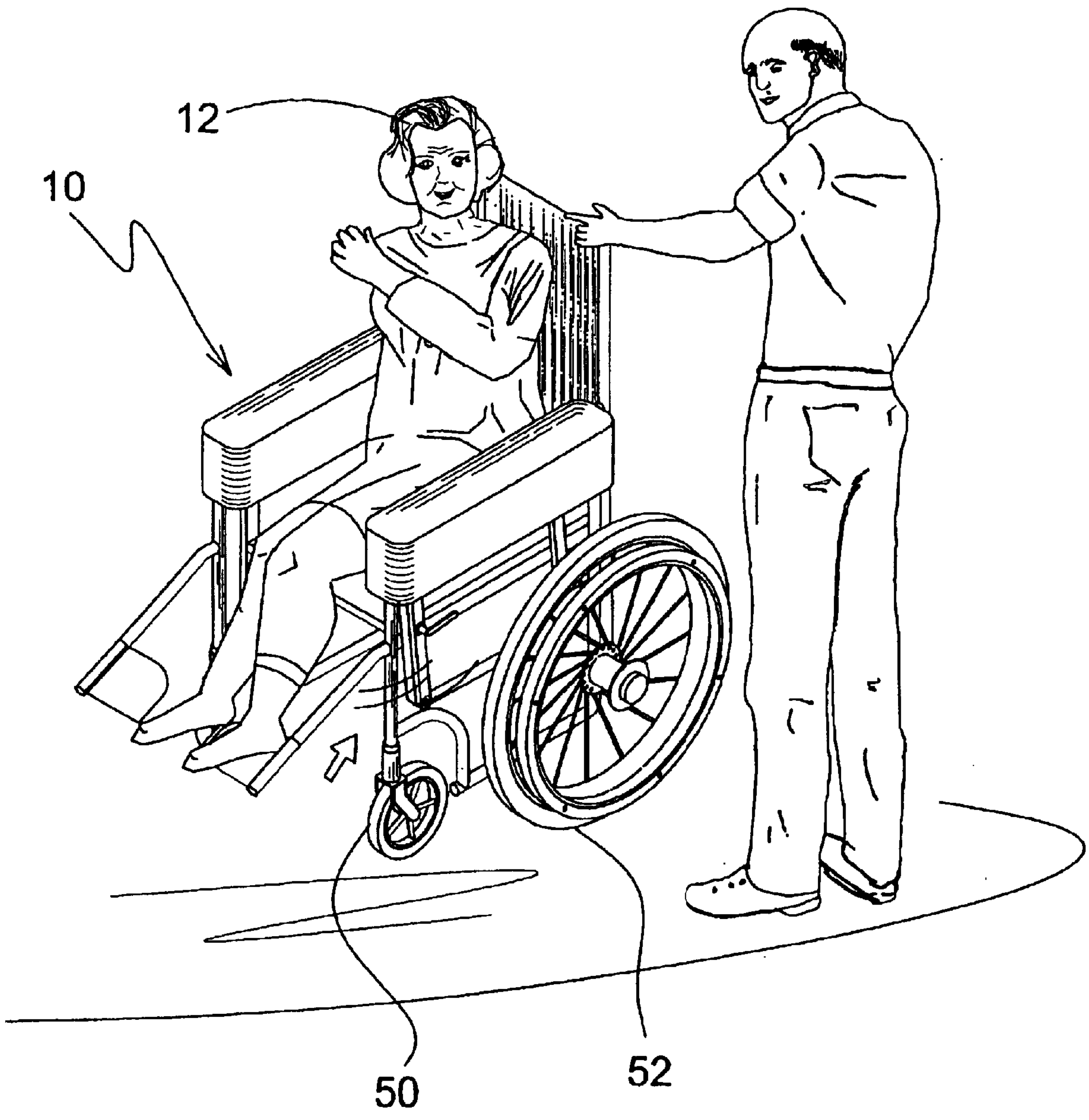
FIG. 1 is an illustrative view of the present invention glider wheelchair in use.

With regard to reference numerals used, the following numbering is used throughout the drawings.

10 present invention
12 occupant
14 arm rest
16 locking handle
18 swing arms
20 outer wheel frame
22 seat
24 inner seat frame
26 locking pin
28 pivot hinge
30 seat back
32 sleeve bearing
34 aperture
36 front brake mechanism
38 rear brake mechanism
40 front stop
42 rear stop
44 glide motion control
46 linear motion control
48 battery pack
50 front wheel
52 rear wheel
54 foot rest

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 which discloses a glider wheelchair in use. Depicted in FIG. 1 is the glider wheelchair 10 with an occupant 12 enjoying the ability to swing. The glider wheelchair 10 includes an outer frame that supports the wheel structure and an inner frame that supports the seat or chair. The outer and inner frames are interconnected by means of a pair of swing arms on the front and rear of the wheelchair 10 that allow the inner frame to pivot and glide within the outer frame. The swing arms pivot between the front 50 and rear wheels 52 allowing the center of gravity to remain within the wheelchair 10 while in motion ensuring stability.

Figure 2:
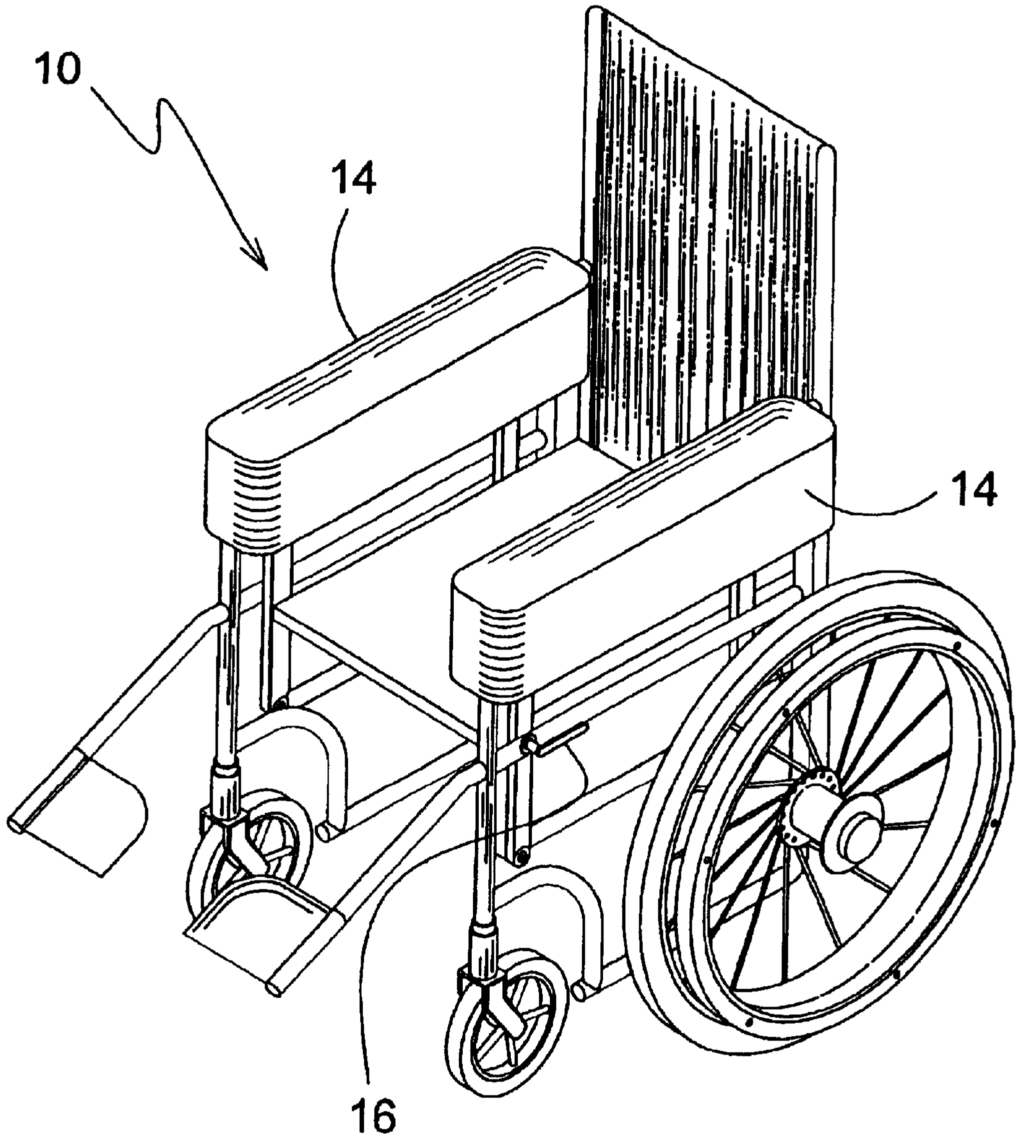
FIG. 2 is an isometric view of the present invention glider wheelchair.

Turning to FIG. 2, shown therein is an isometric view of the present invention 10 which discloses a glider wheelchair. To protect the occupant from pinch points created by the pivoting motion, the glider wheelchair arm rests 14 are molded to cover the upper pivot hinge. In addition, to prevent an undesired swinging motion, a locking handle 16 is affixed to the outer frame. To prevent the wheelchair 10 from swinging, the locking handle 16 rod penetrates an aperture in the swing arm.

Figure 3:
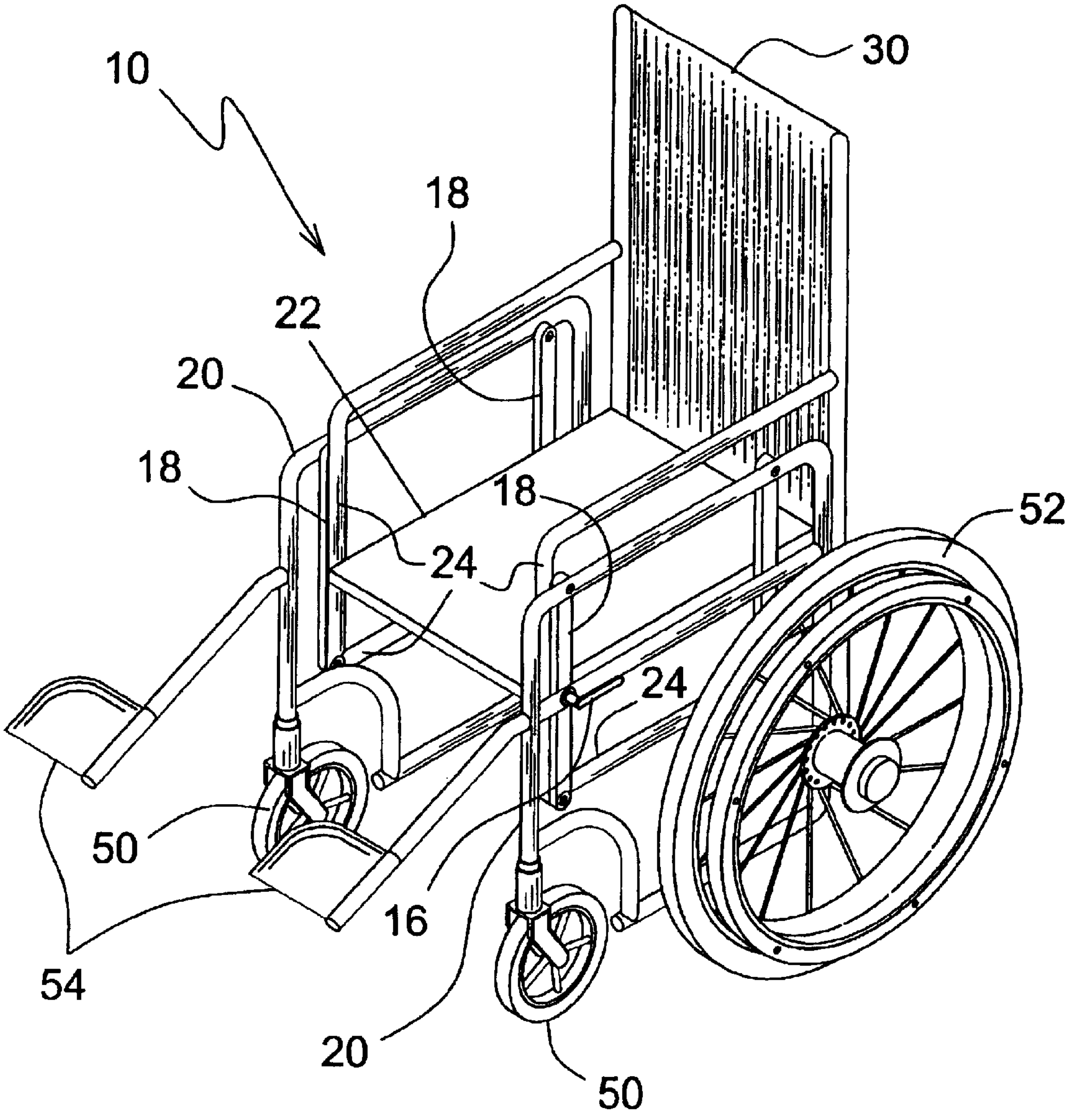
FIG. 3 is an isometric view of the present invention glider wheelchair.

Turning to FIG. 3, shown therein is an isometric view of the present invention 10 which discloses a glider wheelchair. Depicted in FIG. 3 is the glider wheelchair 10 with the protective arm rests removed. The upper end of the swing arms 18 are hinged to the outer wheel frame 20 and the lower end of the swing arms are hinged to the inner seat frame 24. Also shown are seat 22, seat back 30, pivotal front caster wheels 50, rear main wheels 52 for driving the present invention 10, foot rests 54 and locking handle 16.

Figure 4:
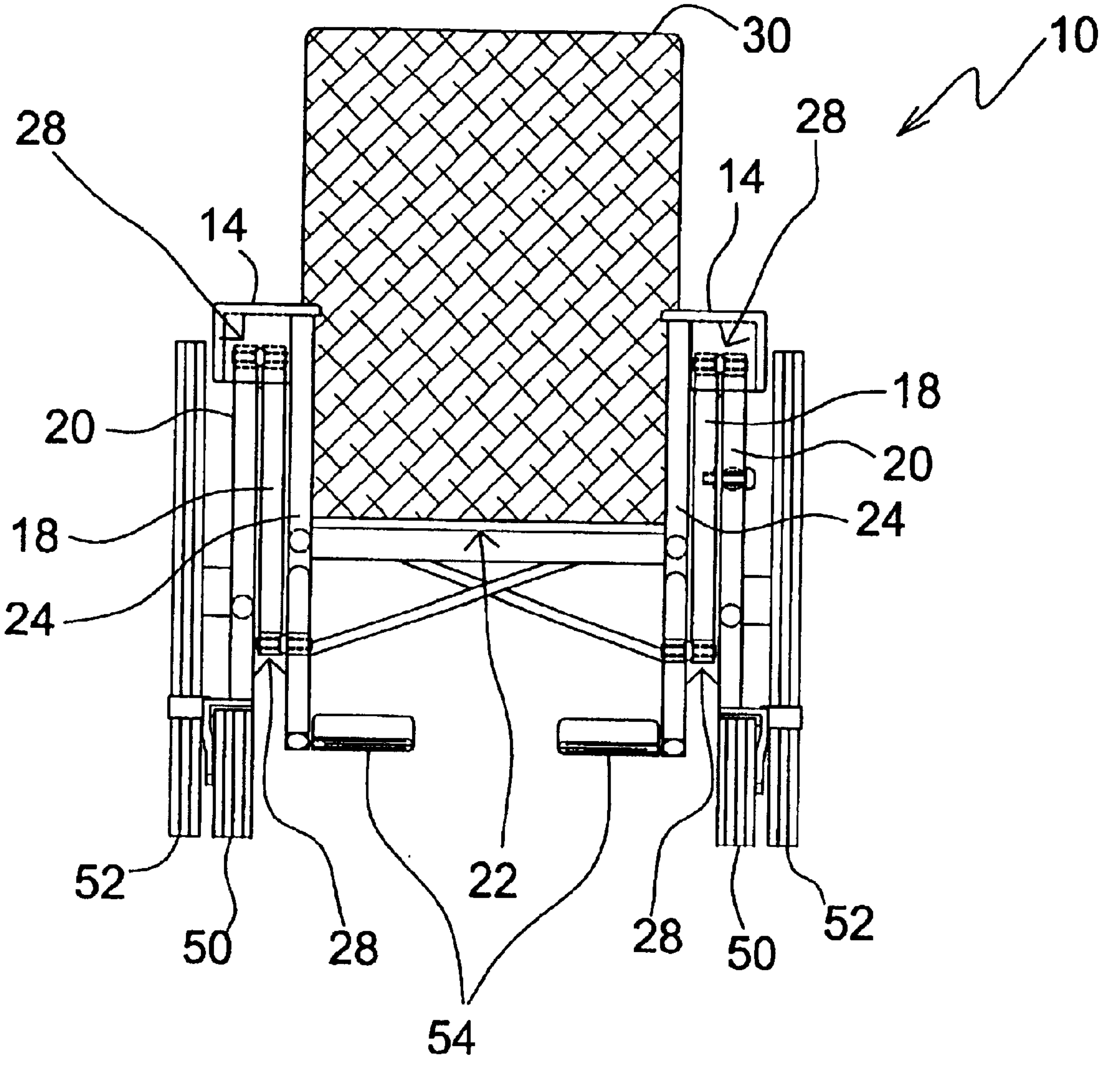
FIG. 4 is an front view of the present invention glider wheelchair.

Turning to FIG. 4, shown therein is a front view of the present invention 10 which discloses a glider wheelchair. The glider wheelchair 10 is hinged at four points. The upper hinge pins 28 are concealed within and under the arm rest 14 and connect the outer wheel frame 20 to the upper ends of the left and right swing arms 18. The lower hinge pins 28 are positioned below the seat 22 and connect the seat frame 24 to the lower ends of the left and right swing arms 18. Also shown are seat back 30, front and rear wheels 50, 52 and foot rests 54.

Figure 5:
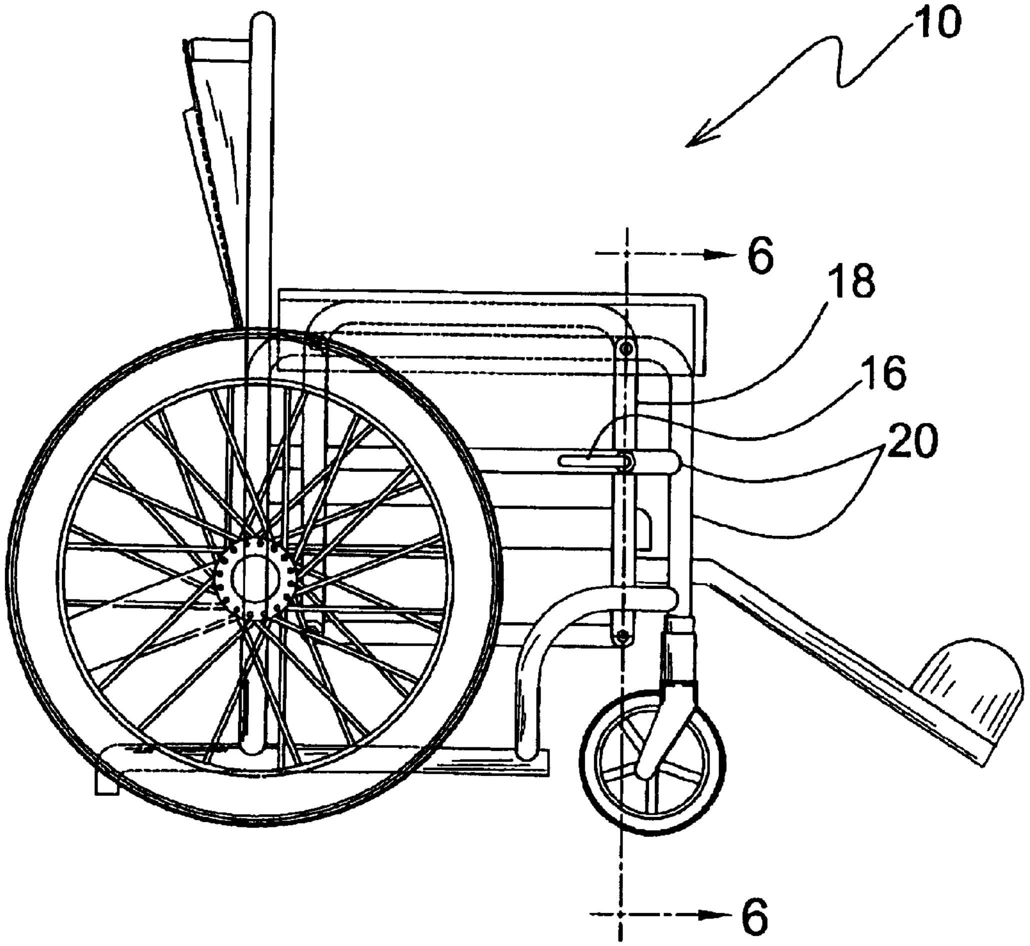
FIG. 5 is a side view of the present invention glider wheelchair.

Turning to FIG. 5, shown therein is a side view of the present invention 10 which discloses a glider wheelchair. A locking handle 16 is affixed to the outer frame 20 to prevent undesired gliding motion. To lock the frame, the handle 16 is rotated and a locking rod penetrates an aperture in the swing arm 18 preventing the wheelchair from swinging motion.

Figure 6:
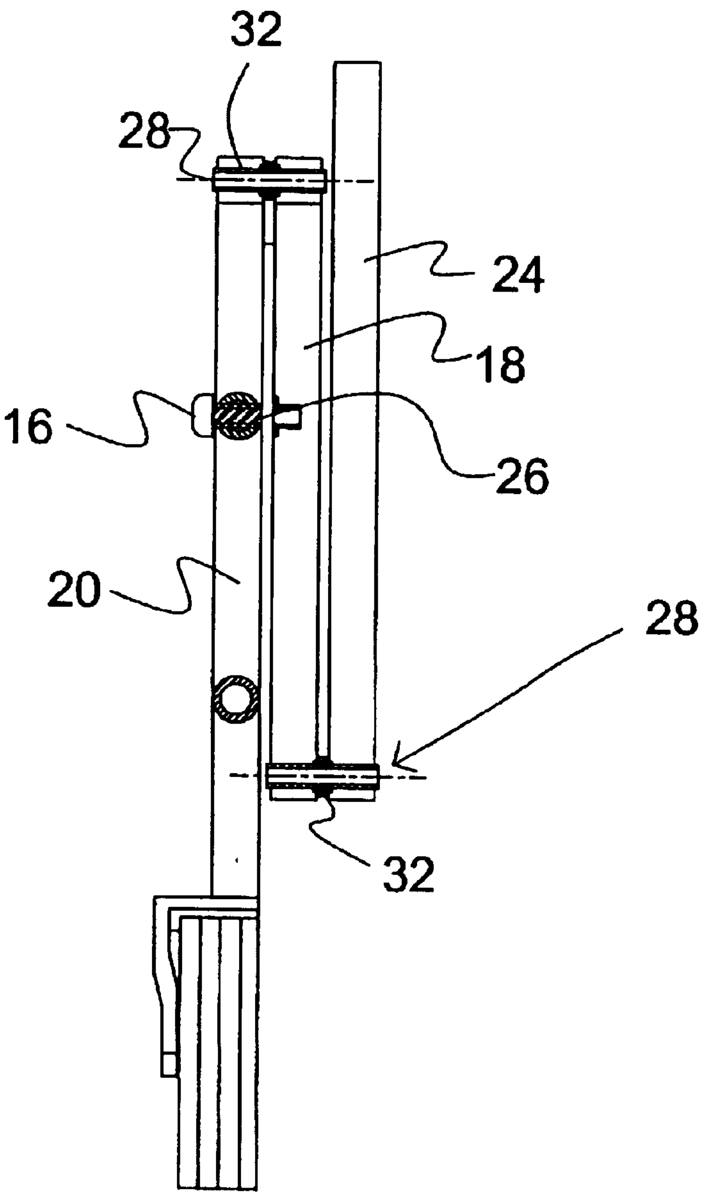
FIG. 6 is a cross section view of the present invention glider wheelchair.

Turning to FIG. 6, shown therein is a cross section view of the present invention 10. Depicted is a sectional view taken from FIG. 5. When the locking handle 16 is positioned for free motion, the locking pin 26 is retracted from a co-aligned aperture in the swing arm 18 allowing the swing arm to pivot. The upper and lower pivot hinges 28 interconnects the outer 20 and inner frame 24 and each hinge 28 has a sleeve bearing 32 to provide spacing between the members 18, 20, 24.

Figure 7:
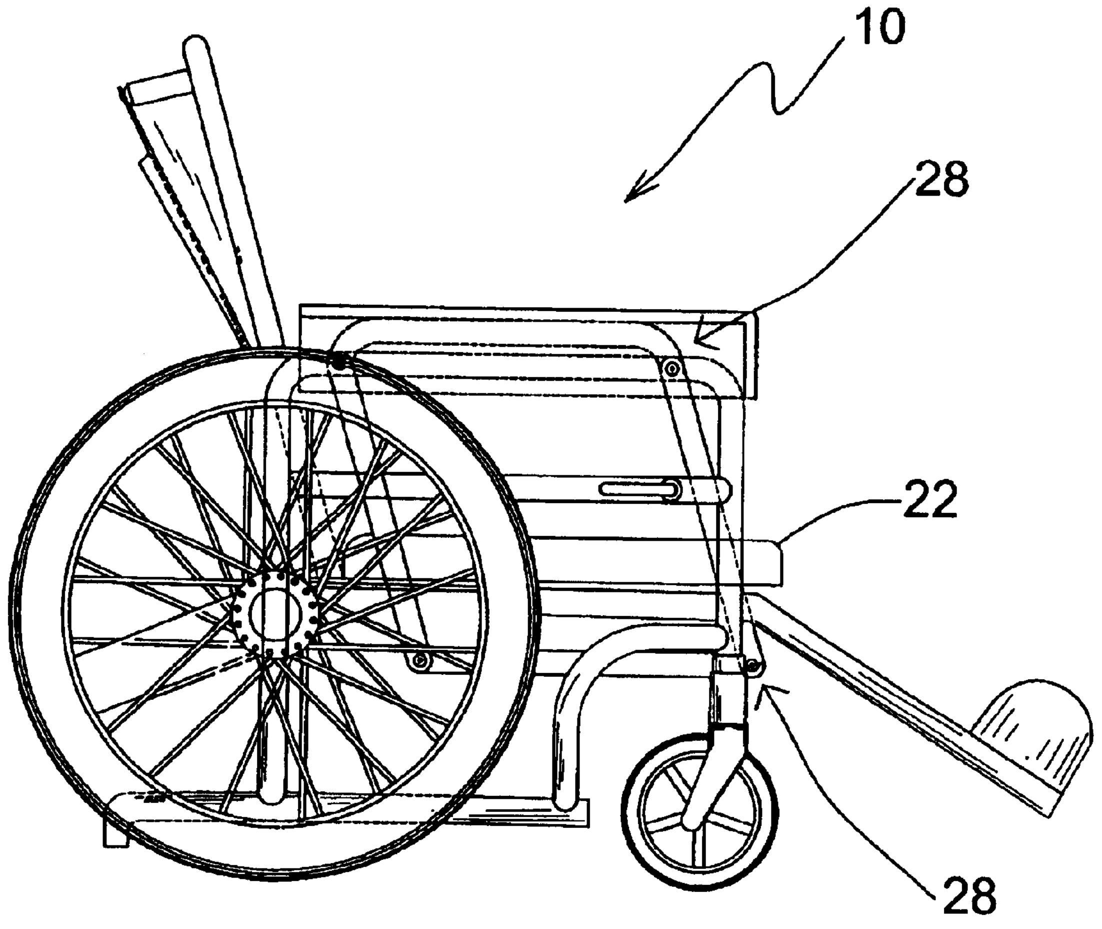
FIG. 7 is a side view of the present invention glider wheelchair in motion.

Turning to FIG. 7, shown therein is a side view of the present invention 10 which discloses a glider wheelchair in motion. Depicted in FIG. 7 is the glider wheel chair in a forwardly pivoted position. The dual upper and lower pivot points 28 allow the seat 22 to remain parallel to the floor or supporting surface while allowing the occupant free movement without tipping the seat forward and backward.

Figure 8:
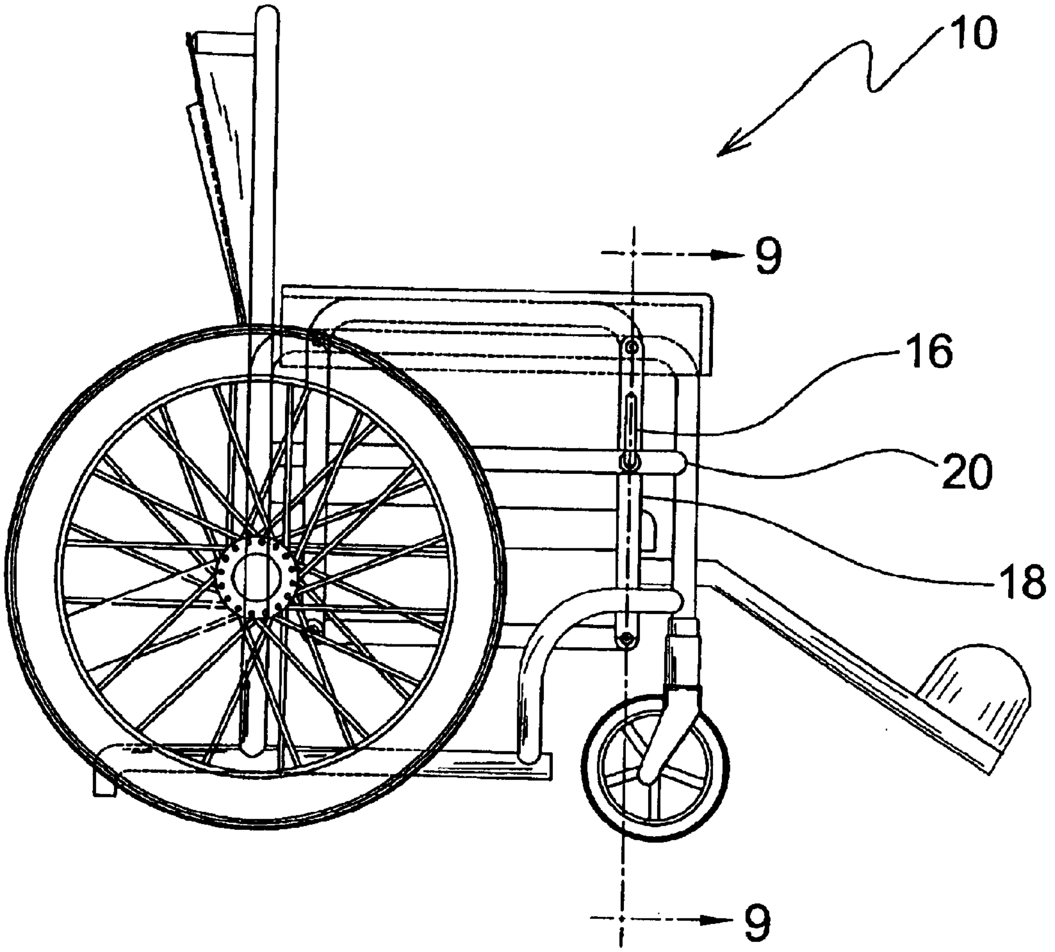
FIG. 8 is a side view of the present invention glider wheelchair with lock engaged.

FIG. 8 is a side view of the present invention 10 which discloses a glider wheelchair with lock 16 engaged. A locking handle 16 is affixed to the outer frame 20 to prevent undesired gliding motion. To lock the frame 20, the handle 16 is turned allowing a pin 26 (not visible, but see FIG. 6) to penetrate an aperture in the swing arm 18.

Figure 9:
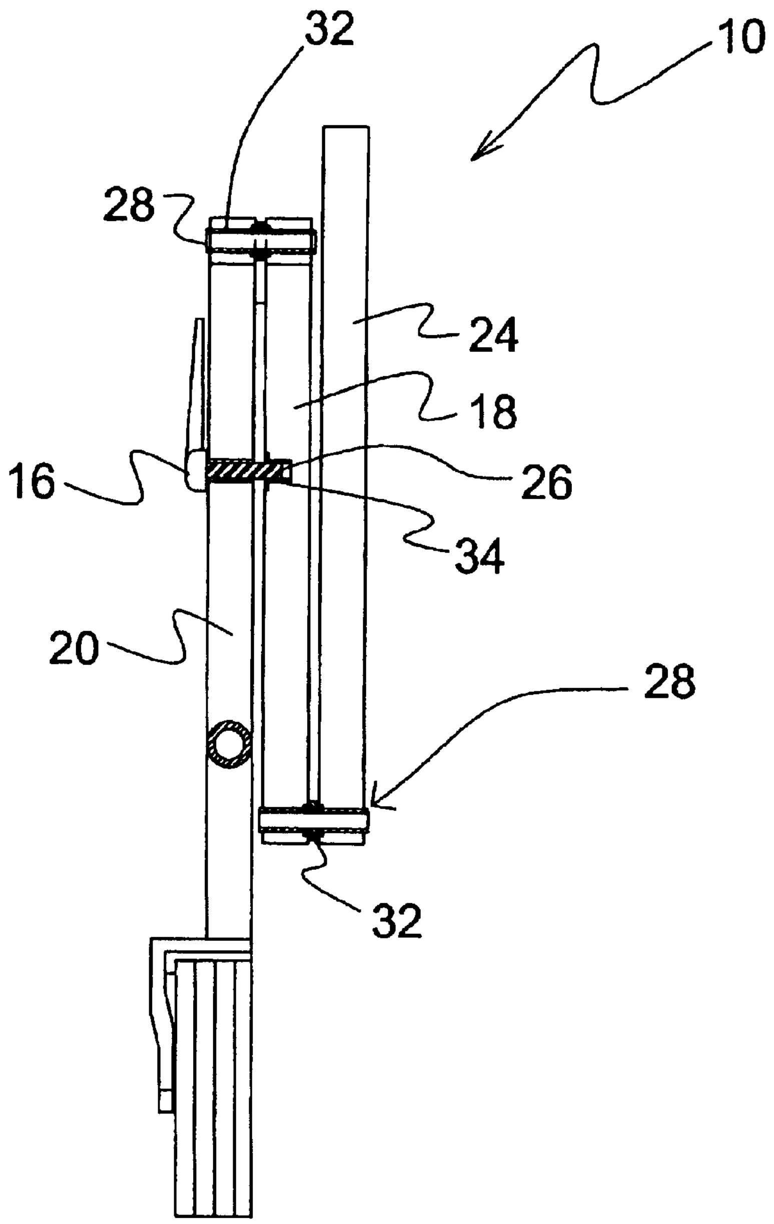
FIG. 9 is a cross section view of the present invention glider wheelchair.

Turning to FIG. 9, shown therein is a cross section view of the present invention 10. Depicted is a sectional view taken from FIG. 8. When the handle 16 is turned and the locking pin 26 is engaged into the swing arm 18 aperture 34, the upper and lower pivot hinges 28 pins are restricted from a pivoting motion. In turn, the wheelchair seat will also remain motionless. Also shown are the outer frame 20, inner frame 24 and sleeve bearing 32.

Figure 10:
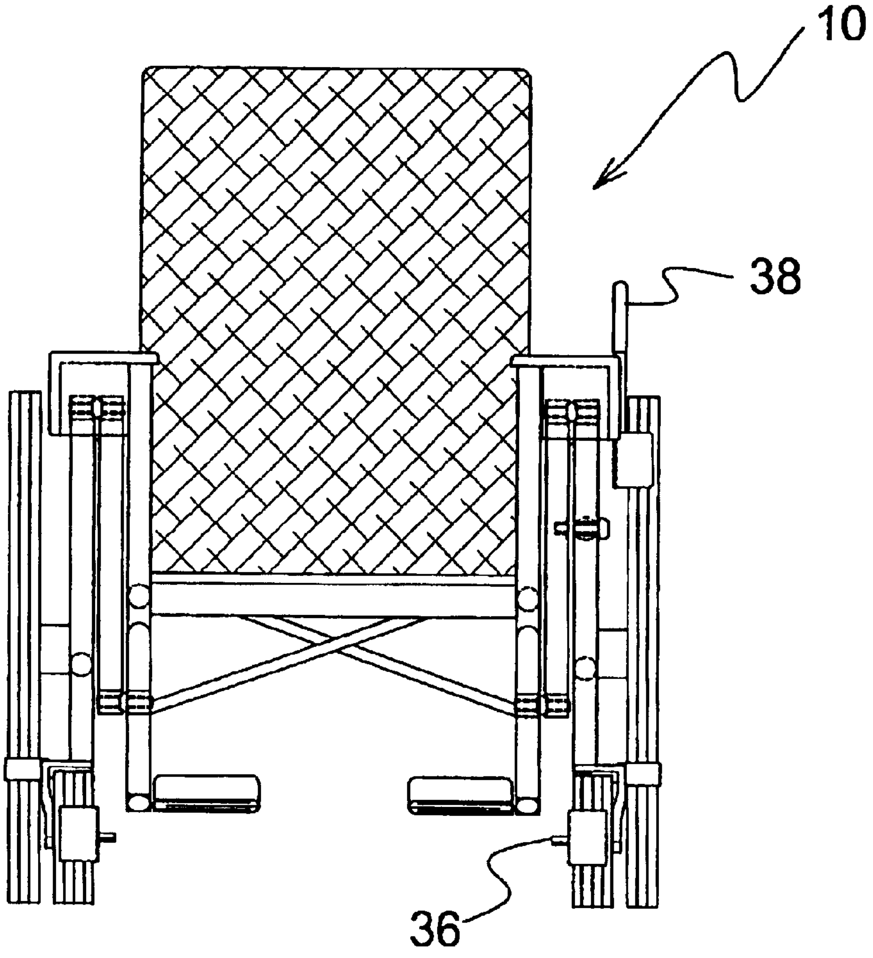
FIG. 10 is a front view of the present invention glider wheelchair with preferred additional element.

Turning to FIG. 10, shown therein is a front view of the present invention 10 which discloses a glider wheelchair with a preferred additional element. Depicted in FIG. 10 is a glide wheelchair 10 with mechanical front 36 and rear 38 wheel brakes. Front 36 and/or rear wheel brakes 38 are engaged to maintain a stationary position while the user utilizes the glider motion. Typical of prior art, the brake mechanism 36, 38 are positioned such that the rear wheel brake 38 is engaged by hand, and the foot engages the front wheel brake 36.

Figure 11:
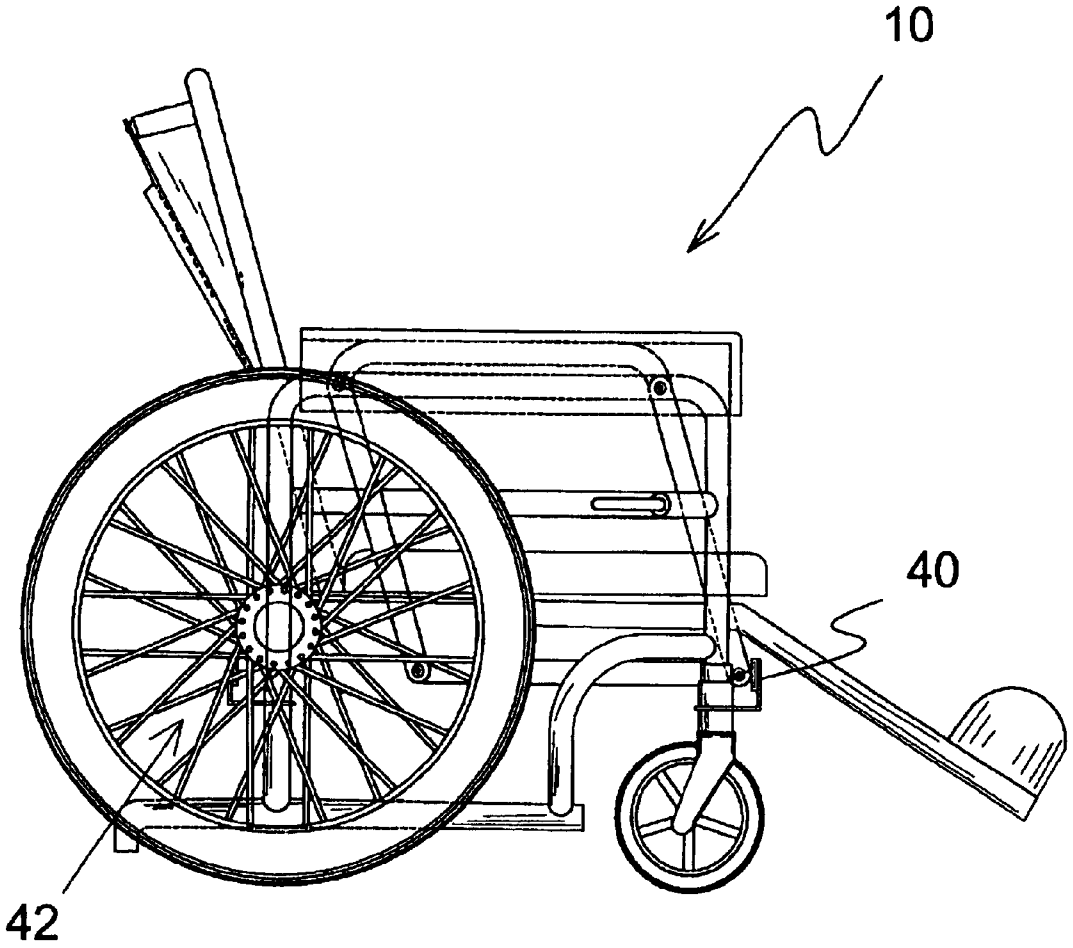
FIG. 11 is a side view of the present invention glider wheelchair with preferred additional element.

Turning to FIG. 11, shown therein is a side view of the present invention 10 which discloses a glider wheelchair with a preferred additional element. Depicted in FIG. 11 is a glider wheelchair 10 with a front 40 and rear 42 stop to restrict the swing arc of the glider motion. By including restrictor stops 40, 42 to limit the arc of the swing, the center of gravity is better contained within the wheelchair 10 frame and thus stability of the wheelchair is improved.

Figure 12:
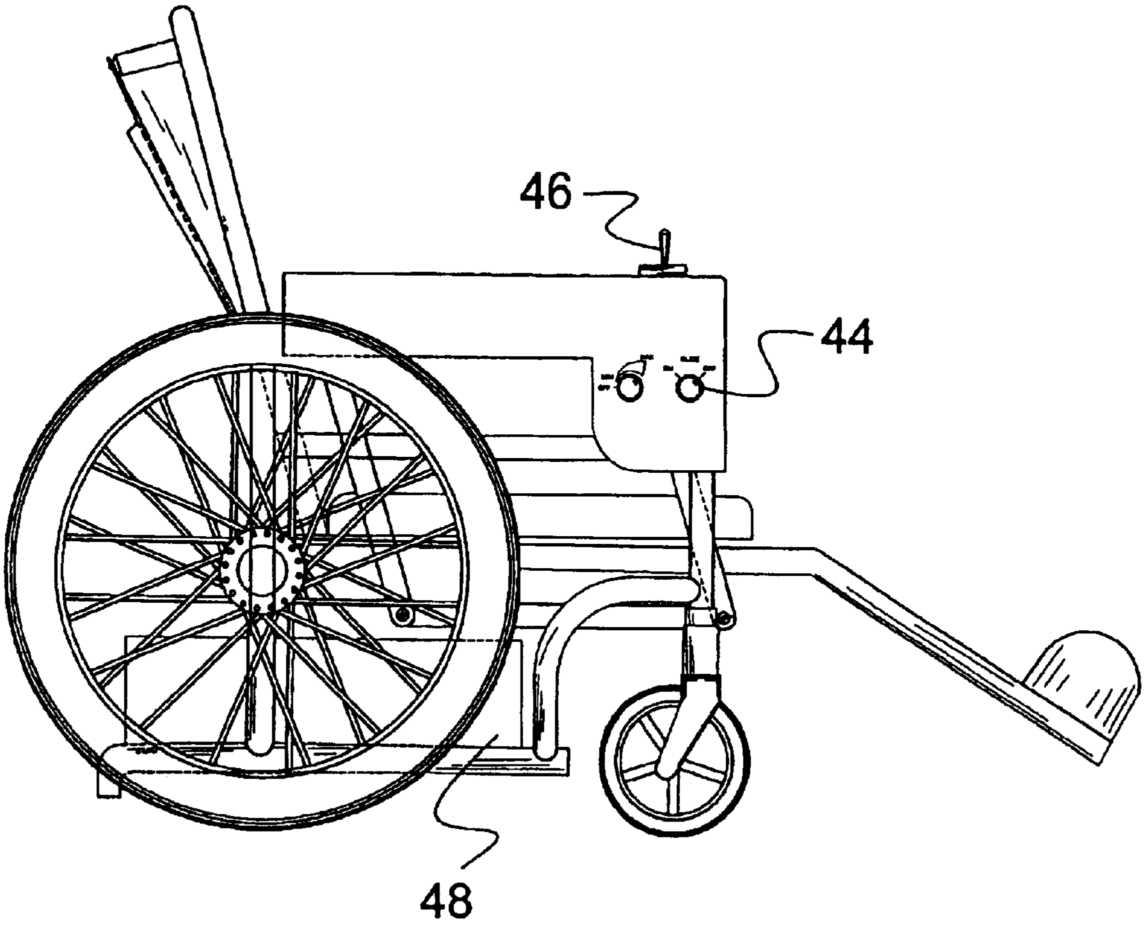
FIG. 12 is a side view of the present invention glider wheelchair with preferred additional element.

Turning to FIG. 12, shown therein is a side view of the present invention 10 which discloses a glider wheelchair with a preferred additional element. Depicted in FIG. 12 is an electric glide wheelchair controlled by means of a dual motor drive system. The glide motor drive contains a variable speed switch to control 44 the automatic glide motion. An interlock switch is provided to lock the frame and disable the linear motion controls 46. When glide motion is enabled, the linear motion controls 46 are disabled and the wheel lock is engaged. When glide motion is disabled, the frame is locked and the linear motion controls 46 are enabled allowing the user to move from point to point. A battery pack 48 is used to power both glide motor drive and linear motor drive systems.

What is claimed to be new and desired to be protected by Letters Patent is set forth in the appended claims.

1. A glider wheelchair, comprising:

a) a first frame formed of spaced apart rigid side members connected together by cross braces, each of said side members having upper and lower members and front and rear members;

b) a pair of main wheels connected to said first frame, wherein at least one of said main wheels serves as a driving wheel for the glider wheelchair;

c) at least one caster wheel pivotally connected with said first frame;

d) a second frame formed of spaced apart rigid side members connected together by cross braces, each of said side members having upper and lower members and front and rear members, wherein said second frame is disposed within said first frame;

e) a seat being disposed on said second frame, said seat having a back disposed thereon to permit a person to sit in the seat; and, f) a plurality of swing arms connecting second frame to said first frame wherein said second frame moves in a glider motion between said front and said rear of the glider wheelchair.

2. The glider wheelchair of claim 1, wherein said pair of main wheels are disposed on said rear of said first frame and said caster wheel is disposed on said front of said first frame.

3. The glider wheelchair of claim 1, wherein said at least one caster wheel comprises a pair of caster wheels.

4. The glider wheelchair of claim 3, further comprising a pair of foot rests disposed on said front of said first frame to permit a user to place their feet thereon.

5. The glider wheelchair of claim 4, wherein said plurality of said swing arms comprise four swing arms, each of said swing arms being substantially vertically disposed having upper and lower ends, wherein said swing arms are spaced apart about said seat of the glider wheelchair.

6. The glider wheelchair of claim 5, wherein said upper end of each of said swing arms are pivotally connected to said first frame and said lower end of each of said swing arms are pivotally connected to said second frame to permit the second frame to move in a glider motion within said first frame.

7. The glider wheelchair of claim 6, wherein said upper end of each of said swing arms are pivotally connected to said upper member of said first frame and said lower end of each of said swing arms are pivotally connected to said lower member of said second frame.

8. The glider wheelchair of claim 7, further comprising means for a pivotal connection disposed on said upper and lower ends of said swing arms whereby the swing arms are pivotally connected to the first and second frames.

9. The glider wheelchair of claim 8, wherein said means for a pivotal connection comprises a pivotal connection disposed on said upper and lower ends of said swing arms for pivotally connecting said first and second frames, wherein said pivotal connection comprises a pivot hinge and a sleeve bearing to permit pivotal connection of the first and second frames.

10. The glider wheelchair of claim 9, further comprising means for a locking handle disposed on said first frame whereby the first frame is releasably fixed to at least one of the swing arms.

11. The glider wheelchair of claim 10, wherein said means for a locking handle comprises a handle connected to a locking pin, wherein said first frame and said swing arms each have co-aligned apertures, wherein said locking pin is movably inserted through said apertures to lock said first frame to said swing arm to permit the first frame and the swing arm to be movably fixed to each other.

12. The glider wheelchair of claim 11, further comprising at least one brake disposed on said caster wheels, wherein said brake is operated by a foot of a user to permit the glider wheelchair to be releasably secured in place.

13. The glider wheelchair of claim 12, further comprising at least one brake disposed on said main wheels, wherein said brake is operated by a hand of a user to permit the glider wheelchair to be releasably secured in place.

14. The glider wheelchair of claim 13, further comprising at least one front stop and at least one rear stop disposed on said first frame, wherein said front stop limits the forward motion of said swing arm and said rear stop limits the rearward motion of said swing arm to permit the glider wheelchair to be stabilized.

15. The glider wheelchair of claim 14, further comprising a pair of arm rests disposed over said upper members of said first and second frames to permit a user to rest their arms thereon.

16. The glider wheelchair of claim 15, further comprising an electrical linear motion drive system and an electrical glider motion drive system to permit the glider wheelchair to be driven so as to provide linear motion and glider motion, wherein when said linear motion drive system is operational said glider motion drive system is not operational, wherein when said glider motion drive system is operational said linear motion drive system is not operational.

* * * * *